SYNCHRONIZATION OF CODE SYSTEMS

Filed Sept. 27, 1967 2 Sheets-Sheet 1

INVENTOR
J. O. BERGHOLM
BY Leonard U. Arnold
ATTORNEY

April 28, 1970 J. O. BERGHOLM 3,509,278

SYNCHRONIZATION OF CODE SYSTEMS

Filed Sept. 27, 1967 2 Sheets-Sheet 2

United States Patent Office 3,509,278 Patented Apr. 28, 1970

United States Patent Office 3,509,278

Patented Apr. 28, 1970

3,509,278

SYNCHRONIZATION OF CODE SYSTEMS

Joseph O. Bergholm, Matawan Township, Monmouth County, N.J., assignor to Bell Telephone Laboratories, Incorporated, Murray Hill, N.J., a corporation of New York Filed Sept. 27, 1967, Ser. No. 670,941
Int. Cl. H04l 7/00; H04b 1/00
U.S. Cl. 178—69.5 4 Claims

ABSTRACT OF THE DISCLOSURE

Framing of reflected binary code signals into code words is accomplished by inserting an alternating "1" "0" pulse pattern in the least significant digit of an occasional Gray code word. The second digit of each Gray code word is monitored and when a first "0" in that digit is detected by the monitoring apparatus, a "1" is inserted in the least significant digit of that code word in place of the pulse signal. The monitoring process is then inhibited for a predetermined number of code words and then resumed with the insertion of a "0" in the least significant digit of a second such code word. This process continues with alternating "1's" and "0's" being inserted in the least significant digit of monitored code words.

BACKGROUND OF THE INVENTION

In pulse code systems a message wave is converted at a transmitter into groups of sequential pulse signals. Each group constitutes a code word whose number of signals depends upon the code being employed. Once encoding has taken place, recovery of the information contained in the message wave requires that the pulse signals be correctly grouped, i.e., correctly framed, at a receiver.

Three basic techniques have been employed in the prior art in order to accomplish word framing. A first introduces an extra pulse position between every *n*th code word in which to transmit an alternate "1" "0" pattern which can be detected at the receiver. A second technique introduces an alternate "1" "0" pattern in the least significant digit of every *n*th code word. In both of these techniques the receiver samples the pulse stream and attempts to locate the "1" "0" pattern. The first technique has the disadvantage that additional equipment is required to insert an extra bit in the transmitter, and to remove that extra bit and smooth the pulse stream at the receiving terminal. The second technique does not require excessive equipment but introduces noise into the received signal by virtue of the fact that the least significant digit of every *n*th code word is used for framing.

In order to accomplish the framing of pulse signals without reducing channel capacity, statistical framing techniques have been employed. In United States Patent 3,175,157 issued to J. S. Mayo et al., Mar. 23, 1965, framing is accomplished by detecting a divergence between the anticipated and actual properties of a reconstituted code word. The technique there employed relies on the fact that when code signals are out-of-frame, the properties of a message wave reconstituted from those signals differs appreciably from the properties of the message wave as originally transmitted. Hence, an in-frame condition can be achieved by reframing a receiver decoder until the actual and anticipated properties are rendered substantially identical. A measure of the known probability amplitude distribution of the input signal is employed in the receiving apparatus and a comparison made by means of a root-square reading between a measure obtained when the signal is in-frame and the signal actually obtained. Upon detection of a disparity between these readings, incoming pulse signals are regrouped until the disparity is reduced.

While the apparatus disclosed in Patent 3,175,157 operates satisfactorily, it is relatively complex and expensive. Copending application, Ser. No. 272,588, filed on Apr. 12, 1963, now Patent No. 3,436,480 attempts to simplify the statistical framing apparatus by monitoring the distribution of a characteristic of the code used to represent the message wave rather than the distribution of message wave amplitude and spectral characteristics. In accordance with the invention disclosed in that application, the signals associated with the second and third digits of a reflected binary code word are individually monitored to detect a departure from anticipated probabilities. Specifically, it has been found that the signals associated with the second and third digits of each such code word have higher and lower rates of occurrence of "1's" than the signals associated with the other digits of the code word. The rates of occurrence of "1's" in the second and third time slots are compared and when the rate of occurrence of "1's" in the third time slot exceeds the rate of occurrence in the second time slot, the signals are assumed to be out-of-frame and are regrouped. Specifically, the circuit uses a pair of racing counters: one counts "0's" in the second digit, and the other, "0's" in the third digit of each code word. When the system is in-frame the first counter seldom reaches full count before the second, whereas in out-of-frame conditions either counter can reach full count first with equal probabilities. The circuitry disclosed in that patent application operates satisfactorily with input signals having an amplitude distribution which approximates that of a Gaussian distribution. It does not operate satisfactorily, however, where the signals have a flatter than Gaussian distribution.

It is an object of this invetnion, therefore, to reduce the cost and complexity of statistical framing apparatus capable of operating with input signals having a flatter than Gaussian amplitude distribution.

SUMMARY OF THE INVENTION

In accordance with this invention, framing of reflected binary code signals into code words is accomplished by inserting an alternating "1" "0" pulse pattern in the least significant digit of an occasional Gray code word. The second digit of each Gray code word is monitored and when a first "0" in that digit is detected by the monitoring apparatus, a "1" is inserted in the least significant digit of that code word in place of the pulse signal. The monitoring process is then inhibited for a predetermined number of code words and then resumed with the insertion of a "0" in the least significant digit of a second such code word. This process continues with alternating "1's" and "0's" being inserted in the least significant digit of such code words. Specifically, apparatus embodying this invention monitors the second digit of the Gray code words as they are being formed, and when a first code word with a second digit equal to "0" occurs the apparatus inserts a "1" in the least significant digit of the code word and deletes any signal present in that least significant digit. After performing this operation the monitoring apparatus is inhibited for *k* code words and then resumes the process, inserting a "0" in the least significant digit of the second monitored code word. This process continues with alternating "1's" and "0's" being inserted in the least significant digit of such code words. At the receiver a provisional grouping of the received bit stream into code words is made, followed by an investigation by apparatus, including monitoring apparatus, to determine if the signal present in the provisionally chosen least significant digit of monitored code words having a "0" in the second time slot are alternate "1's" and "0's." If not, another provisional grouping is made until a provisionally chosen least significant digit, or time slot of such monitored words contains alternate "1's" and "0's." The framing is then correct.

The amplitude distribution of the signal to be encoded determines the presence or absence of second digit "0's," and the frequency with which this process occurs thus depends upon the amplitude distribution of the input signal as well as the value $k$. The number of words, $k$, that are not monitored after inserting a framing signal in the least significant digit or time slot, determines the reframe time and the amount of noise that is introduced into the system and an appropriate value for $k$ is obtained by balancing reframe time against introduced noise for the various types of signals that are encountered.

DETAILED DESCRIPTION OF THE PREFERRED EMBODIMENT

Figure 1:
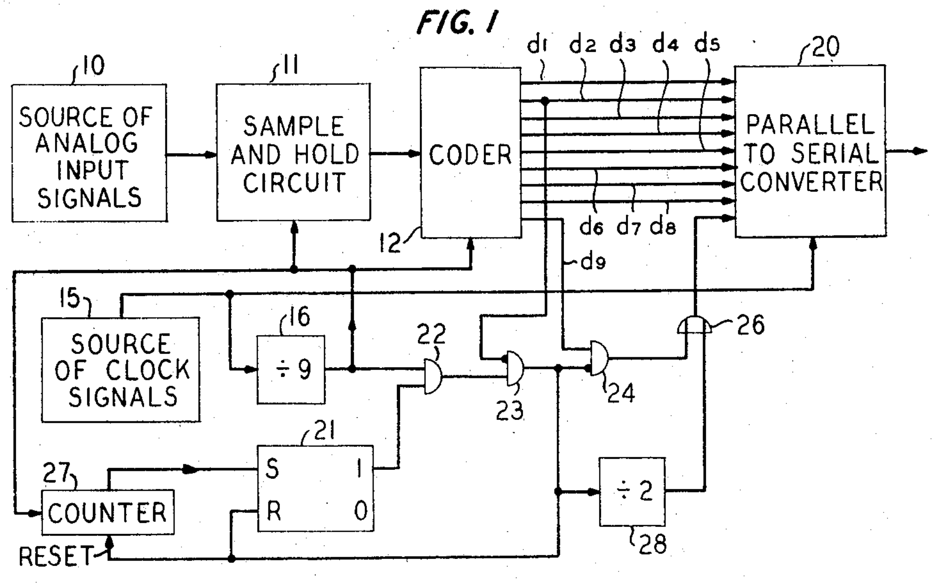
FIG. 1 is a pulse transmitter embodying this invention.

At a pulse transmitter embodying this invention such as that shown in FIG. 1, a message wave from a source of analog input signals 10 is sampled by a sample and hold circuit 11 and coded into code words by a coder 12. The sample and hold circuit 11, as well as the coder 12, are controlled in operation by signals derived from a source of clock signals 15 which are applied to a divider circuit 16 which generates an output signal of one time slot duration upon the occurrence of every $n$ signal from source 15, where $n$ is equal to the number of digits in each code word. For purposes of the present explanation assume, as an example, that the analog input signals are to be encoded into nine-digit words; divider circuit 16 would then produce an output pulse for every nine pulses received from source 15.

The output signals from the coder 12 comprise the nine-digit code word in parallel form. That is to say, the code word appears simultaneously on nine parallel output terminals conventionally designated $d_1$ through $d_9$ with the signal on terminal $d_1$ representing the most significant digit or time slot, and the signal on terminal $d_9$ the least significant digit.

In accordance with this invention, the signal present in the second digit of the code word is monitored in order to detect the presence of a "0" in that digit and when such a condition is detected, the signal present on terminal $d_9$ is not transmitted but is replaced by either a "1" or a "0." To accomplish these ends, bistable circuit 21 located at the transmitter is initially in the set condition and its "1" output terminal connected to one input terminal of an AND gate 22 which has a second input terminal connected to receive the output of divider circuit 16. The output of AND gate 22 is applied to the input terminal of an inhibit gate 23 whose inhibit terminal is connected to the $d_2$ output terminal of coder 12. Thus, upon the occurrence of a first "0" at the $d_2$ output terminal of coder 12, inhibit gate 23 is enabled and the output of divider circuit 16 is transmitted to the inhibit terminal of an inhibit gate 24. Inhibit gate 24 is thus disabled so that the least significant digit present at the $d_9$ output terminal, which is connected to the input terminal of gate 24, is not transmitted during this code word. The output terminal of inhibit gate 24 is applied to one input terminal of an OR gate 26 whose output is connected to the least significant digit input terminal of converter 20. Thus, in response to the detection of a first "0" in the second time slot of a code word, a "0" is transmitted in the least significant digit, in this case the ninth digit, of the code word.

Depending on the initial startup of the system, and in particular upon the initial state of divider circuit 28 whose function will be described below, a "1" may be transmitted in such a first time slot. It is not important whether a "1" or a "0" be transmitted in a time slot defined as a first such time slot so long as alternating "1's" and "0's" are transmitted in the least significant digit of such monitored code words.

In accordance with this invention, the output signal from inhibit gate 23 is applied to the reset input terminal of bistable circuit 21 to reset that circuit and disable AND gate 22. As a result, the monitoring apparatus, including inhibit gate 23, is disabled during the period that the bistable circuit 21 is reset, and a ground or low voltage is applied to the inhibit terminal of gate 24. During the interval of time that bistable circuit 21 is reset therefore, the ninth digit of each code word is transmitted through gates 24 and 26 and applied to the transmission line even in the presence of a "0" in the second digit of a code word. The period of time during which the monitoring apparatus is disabled is determined by counter 27 which is reset by the output of gate 23. Counter 27 counts the output of divider circuit 16 to a predetermined number $k$ so in response to the generation of $k$ output pulses by converter circuit 16, a signal is generated by counter 27 to set bistable circuit 21 and enable AND gate 22. Thus, the monitoring apparatus is disabled following the occurrence of a first code word having a "0" in its second time slot, for a period of $k$ words and is then enabled.

The next occurring "0" in the second time slot of a code word again enables inhibit gate 23 and disables inhibit gate 24 so that the least significant digit is not transmitted. Whereas, in response to the first occurrence of a "0" in the second digit of a code word a "0" was transmitted in the ninth time slot, at this time the output of gate 23 causes divide-by-two circuit 28 to generate an output pulse of the same time duration as a pulse from source 15 which is transmitted through OR gate 26 to the least significant digit input terminal of converter 20. As a result, a "1" is inserted in the least significant digit of the second such detected code word. Again AND gate 22 is disabled by the reset signal applied to bistable circuit 21 by gate 23 and continues to be disabled until counter 27 counts $k$ words. This process continues with alternating "1's" and "0's" being inserted in the least significant digit of such monitored code words. Obviously, the frequency with which this process occurs depends upon the amplitude distribution of the input signal which in turn determines the probability of occurrence of second digit "0's." The number of words $k$ that are not monitored after inserting either a "1" or a "0" in the least significant digit determines the reframe time and the amount of noise introduced into the signal.

Figure 2:
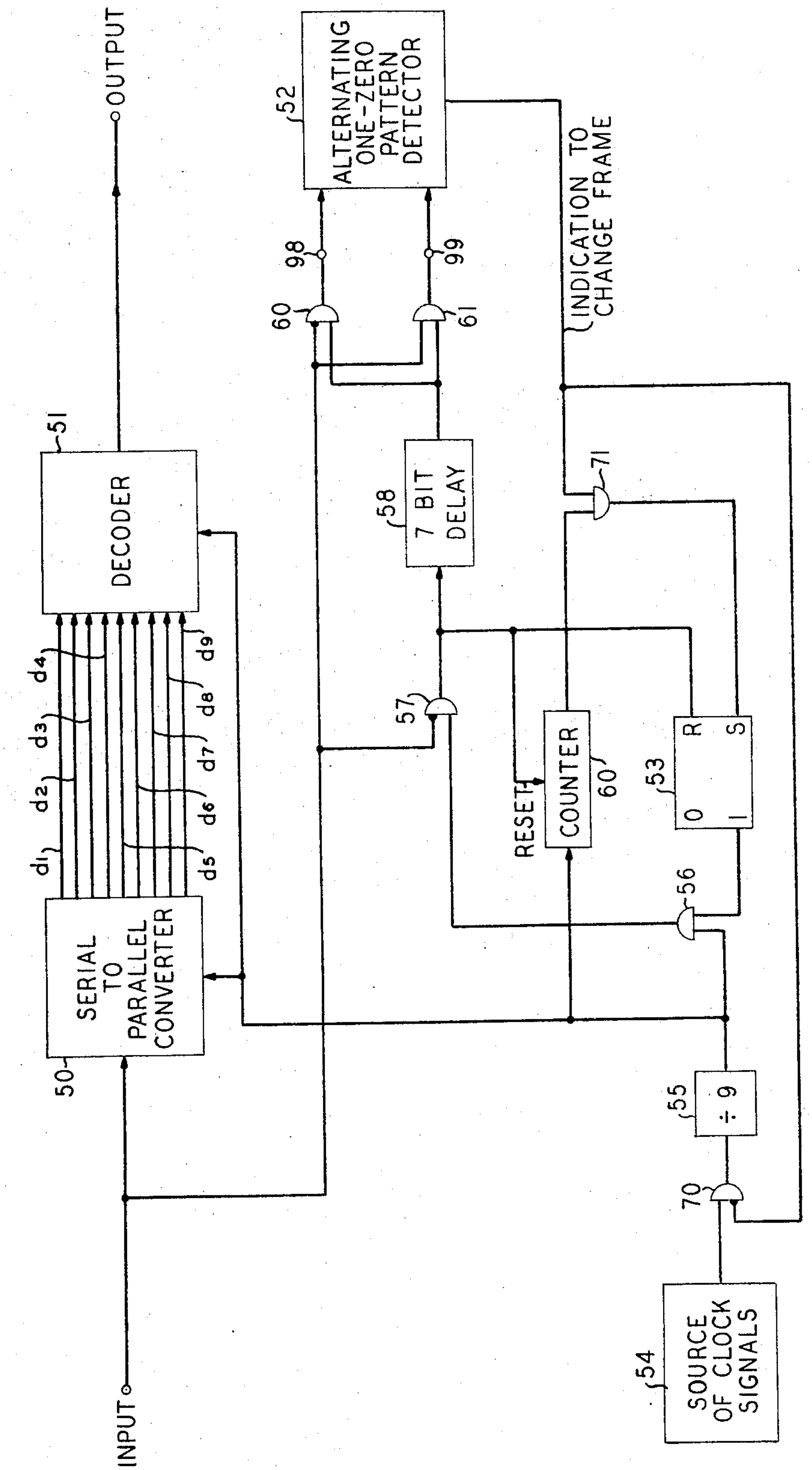
FIG. 2 is a pulse receiver embodying this invention.

Receiving apparatus for decoding the transmitted signals is shown in FIG. 2. In order to frame the incoming bit stream it performs the following functions in order:

(1) It provisionally chooses a received digit as being the second digit of provisionally chosen code words. This second digit is monitored and when a "0" occurs in such a second digit it records the value of the signal transmitted in the least significant digit of the provisionally chosen code word.

(2) The apparatus for monitoring the occurrence of second digit "0's" is then inhibited for $k$ code words.

(3) Again monitors the second digits of the provisionally chosen words and when a second digit "0" occurs compares the value of the least significant digit of that code word with the previously recorded least significant digit. If this second such least significant digit compared to the first indicates the reception of an alternate "1" "0" pattern in the least significant digit of the provisionally chosen code words, the apparatus continues to perform the above functions since the code words are properly framed and the provisionally chosen words are the transmitted code words. If the comparison shows a violation of the "1" "0" pattern, however, an "Out-of-Frame Indication" is registered.

(4) If the number of "Out-of-Frame Indications" is less than three during a predetermined time, then these indications are assumed to be the result of transmission error and the frame position is not changed and the provisionally chosen words still represent the correctly framed words, and the above process is continued. However, if more than three "Out-of-Frame Indications" occur during the predetermined time then the grouping of received bits is changed by one pulse position so that the provisionally chosen code words are now different from those previously investigated, and the investigation of these new provisionally chosen words begins with step (1) above.

To accomplish these ends, the incoming bit stream is applied to a serial-to-parallel converter 50 which generates at its $d_1$ through $d_9$ output terminals, nine bits of the transmitted signal and applies them to a decoder for converting the nine bits into analog form at the output terminal. In order to reproduce the original analog signal, the bits present at the $d_1$ through $d_9$ output terminals must be properly framed. That is to say, the first digit of a code word must appear on the $d_1$ terminal, the second on the $d_2$ terminal . . . and the least significant on the $d_9$ terminal.

In accordance with this invention, proper framing to insure the above result is accomplished by means of apparatus which detects the presence of a "0" in a provisionally chosen second digit, or time slot, and then investigates the occurrence of alternate "1'" and "0's" in a time slot occurring $n-2$ times slots later where $n$ is the number of digits or time slots in a code word. Assume, initially, that an "indication-to-change-frame" signal has been generated by an alternating "1" "0" pattern detector 52, to be described in detail below, indicating that the received signals must be regrouped. This signal is applied through OR gate 71 to set a bistable circuit 53 so that a reference voltage appears at its "1" output terminal. Incoming clock signals from a source of clock signals 54 are applied through an inhibit gate 70 to a divider circuit 55 which divides by a number $n$ equal to the number of bits in a code word, in this illustrative example, nine, so that every ninth clock pulse produces an output pulse of the same duration as a clock pulse from divider circuit 55. The output of divider circuit 55 enables AND gate 56 which generates an output signal which is applied to an inhibit gate 57 during a given one of the nine time slots of the code word which is chosen as the second bit of a provisionally chosen code word.

Once this provisional word grouping is chosen step (1) above commences. In the event a "0" occurs in that provisionally chosen second time slot, inhibit gate 57 produces an output pulse which is delayed by a delay circuit 58 having a delay equal to $n-2$ time slots (in this example, seven). Thus, if gate 57 produces an output during a provisionally chosen second time slot then AND gates 60 and 61 will be enabled during the ninth time slot of the provisionally chosen word. During the ninth time slot either a "1" or a "0" will be present at the input terminal. If a "0" is present at the input terminal, a reference voltage will be generated at terminal 98 at the output of inhibit gate 60 and a ground voltage at the output terminal 99 of AND gate 61. If a "1" is present at the input terminal during this provisionally chosen ninth slot then a reference voltage will be generated at output terminal 99 of AND gate 61 and a ground voltage at terminal 98. In addition, the output of gate 57 serves to reset a counter 60 which is connected to count the output of divider circuit 55.

To inhibit the monitoring apparatus for $k$ code words in accordance with step (2) above, the output of AND gate 57 resets bistable circuit 53 so that AND gate 56 is disabled until counter 60 counts a predetermined number, $k$, code words and then generates an output signal which is transmitted through OR gate 71 to set bistable circuit 53. Thus, upon the occurrence of a "0" in a provisionally chosen second time slot, AND gate 56 is disabled for a period of $k$ words.

After counter 60 counts $k$ words, AND gate 56 is again enabled during the provisionally chosen second time slot. If the words are properly framed a reference voltage appears at that one of the output terminals 98, 99, during the ninth time slot of the next code word, having a "0" in its second time slot, opposite to that where it existed for the first code word. In the event that the reference voltage does not alternate between terminals 98 and 99, then detector 52, which will be described in detail below, generates an output signal of one time slot duration which sets bistable circuit 53 to enable AND gate 56 and, in addition, inhibits inhibit gate 70 so that a single clock pulse from source 54 is not transmitted through gate 70 to divider 55 causing the framing at the receiver to "slip" one time slot so that the apparatus begins investigating the signals present in the ninth time slot of a new provisionally chosen code word. Thus, the circuitry shown in FIG. 2 compares the ninth digit of each provisionally chosen code word with a "0" in the second time slot with the ninth digit of the preceding monitored word. When an alternate "1" "0" pattern is detected the word framing is correct. When no alternate "1" "0" pattern is detected the apparatus "slips" one time slot, chooses a new word grouping, and begins the investigation again.

Figure 3:
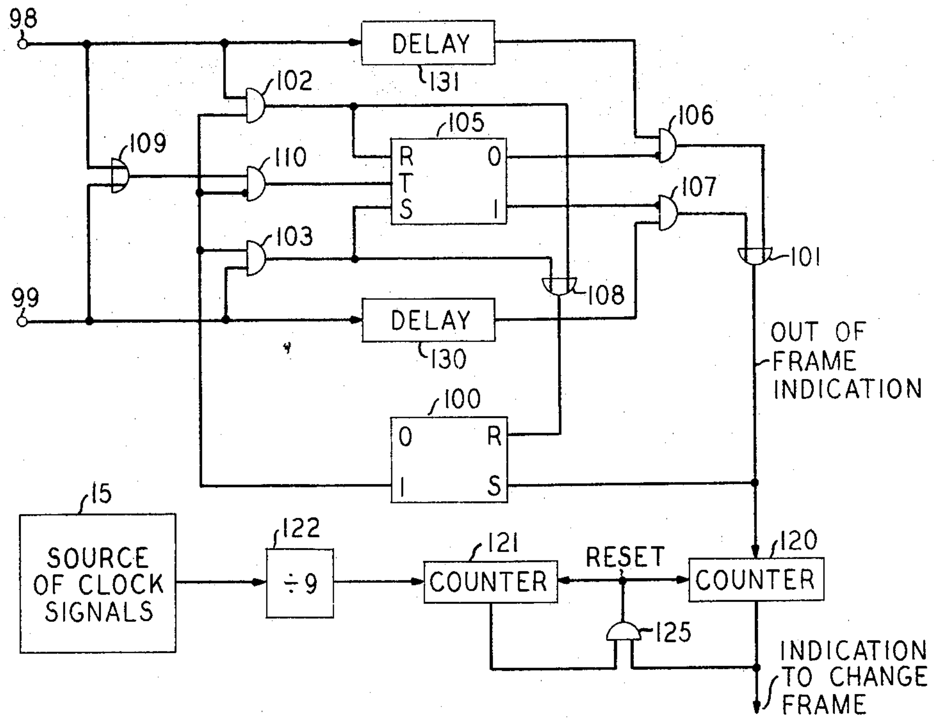
FIG. 3 is a block diagram of the alternating "1" "0" pattern detector shown in the receiving terminal in FIG. 2.

The alternating "1" "0" pattern detector is shown in block diagram form in FIG. 3. The function of the detector is to generate a so-called "indication-to-change-frame" signal whenever the framing of the encoded words is improper. To accomplish this, it records the value of the ninth bit of a monitored word, and compares it with the ninth bit of the next monitored word.

For purposes of explanation, assume, initially, that bistable circuit 100 is in the set condition in response to an "out-of-frame indication" signal generated by OR gate 101. It should be noted that the so-called "out-of-frame indication" signal is an internal signal with the apparatus shown in FIG. 3 and differs from the "indication-to-change-frame" signal which is applied externally to circuitry shown in FIG. 2. When bistable circuit 100 is set, AND gates 102 and 103 are enabled and function to read into bistable circuit 105 an indication of the nature of the signal present at terminals 98 and 99 shown in FIG. 2. As discussed above, when the input signal is a "0" during a provisionally chosen ninth time slot of a code word having a "0" in its second time slot, input terminal 98 has a reference voltage present thereon and input terminal 99 is at ground. Conversely, when the signal present in the provisionally chosen ninth time slot of such a code word is a "1," terminal 99 has a reference voltage present thereon and terminal 98 is at ground. As a result, if a "1" is present in the provisionally chosen monitored ninth time slot AND gate 103 is enabled, bistable circuit 105 is set and a reference voltage appears at its "1" output terminal inhibiting inhibit gate 107. As a result the reference voltage signal at terminal 99, delayed by delay circuit 130, having a delay greater than the delay of gate 103 and circuit 105, is not transmitted by gate 107. Inhibit gate 106 is, however, enabled since a ground voltage appears at its inhibit terminal which is connected to the "0" output terminal of bistable circuit 105. Gate 106 does not produce an output signal since its input terminal connected to terminal 98 is at ground potential. In addition, OR gate 108 is enabled by the output signal from AND gate 103 and bistable circuit 100 is immediately reset disabling gates 102 and 103. Similarly, if a "0" is present in the first such monitored provisionaly chosen ninth time slot, bistable circuit 105 would be reset by the output from AND gate 102, inhibit gate 106 would be disabled so that the reference voltage signal at terminal 98 delayed by delay circuit 131 would not be transmitted by gate 106, AND gate 107 enabled, and gates 102 and 103 disabled by the resetting of bistable circuit 100 by the output of OR gate 108. In this manner the value of the signal transmitted in the least significant digit of the provisionally chosen code word is recorded as recited in step (1) above.

The next operation to be performed by the pattern detector 52 is to compare the value of the least significant digit of the next monitored word with the value now recorded in the detector. Upon the occurrence of the next provisionally chosen ninth digit of a monitored code word, OR gate 109 is enabled by the reference voltage present at one or the other input terminals 98 and 99. Inhibit gate 110, which during the first occurrence of the provisionally chosen ninth time slot was disabled by the reference voltage present at the "1" output terminal of bistable circuit 100, is now enabled by the ground voltage present thereon and the output of OR gate 109 is applied through gate 110 to the toggle input terminal of bistable circuit 105. Bistable circuit 105 is of the type shown in page 629 of "Switching Circuits and Logic Design," by S. H. Caldwell, published by John Wiley & Sons, and a signal applied to the toggle input terminal causes it to change state so that a reference voltage now appears at the "0" output terminal and a ground at the "1" output terminal. Inhibit gate 107 is thus enabled and inhibit gate 106 is disabled so that if a "1" occurs in the provisionally chosen ninth time slot of the second such monitored code word, inhibit gate 107 will generate an output signal which is applied through OR gate 101 to generate an out-of-frame condition signal. Thus if "1's" were present in the ninth time slots of both the first and second such monitored words, which constitutes a violation of the alternating "1" "0" pattern, an out-of-frame condition signal is generated. Similarly, if the signal occurring in the provisionally chosen ninth time slot of the first monitored word were a "0" then bistable circuit 105 would initially have been placed in the reset condition, and would have been set by the second occurrence of the provisionally chosen ninth time slot of a monitored word. Thus, if the second occurrence of the ninth time slot were a "0," gate 106 would have caused the generation of an out-of-frame indication to set bistable circuit 100 and thereby activate AND gates 102 and 103, disable inhibit gate 110 and cause the next occurring provisionally chosen ninth time slot to be recored in bistable circuit 105.

Each out-of-frame indication signal is applied to a counter 120 which after a predetermined number of counts of the out-of-frame indication signal, generates the so-called indication-to-change-frame signal used by the circuitry in FIG. 2 to choose another group of bits of the incoming signal as the provisionally chosen group. Since there is always the possibility of error in pulse transmission, it may well be that the system is in-frame but that an out-of-frame detection is generated by OR gate 101. To eliminate the possibility of spurious errors generating an indication-to-change-frame signal, a counter circuit 121 is provided to count every *n*th clock pulse from source 15. Divider circuit 122 receives the output of the source of clock pulses 15, divides them by the number of digits in each code word (in this example, nine) and applies them to counter 121. Counter 121 typically generates an output pulse for every 200 code words received and this output pulse is applied through OR gate 125 to not only reset counter 121 but also to reset counter 120. Thus, where only a spurious transmission error accounts for the generation of an out-of-frame indication, counter 121 will reach its count before counter 120 and counter 120 will be reset before an indication-to-change-frame signal is generated. Where the system is truly out-of-frame, however, counter 120 will reach its count, (which is typically of the order of three) prior to counter 121 reaching its count. An indication-to-change-frame signal will then be generated by counter 120 which is applied to the apparatus shown in FIG. 2, and also used to reset counters 120 and 121.

Where an alternating "1" "0" pattern is present in the provisionally chosen least significant digit then whichever of the inhibit gates 106 and 107 is enabled at the time of such occurrence will receive a ground voltage at its input terminal and no out-of-frame indication signal will be generated.

Thus, in accordance with this invention, framing of reflected binary code signals into code words is accomplished by inserting an alternating "1" "0" pulse pattern in the least significant digit of an occasional Gray code word. The second digit of each Gray code word is monitored and when a first "0" in that digit is detected by the monitoring apparatus, a "1" is inserted in the least significant digit of that code word in place of the pulse signal. The monitoring process is then inhibited for a predetermined number of code words and then resumed with the insertion of a "0" in the least significant digit of a second such code word. At the receiver, a provisional word grouping is made and the signals in the least significant time slots of words containing "0's" in the second provisionally chosen time slot are monitored to detect an alternate "1" "0" pulse pattern. Where such a pattern is not detected, the transmitted signals are formed into another provisional grouping and the process continued. In this manner initial framing and reframing are accomplished.

It is to be understood that the above described arrangements are merely illustrative of the operation of the principles of the invention. Numerous other arrangements may be devised by those skilled in the art without departing from the spirit and scope of the invention.

What is claimed is:

1. Apparatus for framing reflected binary code signals which comprises, in combination, means at a transmitting terminal for grouping the code signals into individual time slots to form code words, means at the transmitting terminal for monitoring the occurrences of first predetermined signals in a first predetermined time slot, means at the transmitting terminal for transmitting predetermined code signals in a second predetermined time slot upon the occurrence of said first predetermined signal in said first time slot, means at the transmitting terminal for inhibiting said monitoring means for a predetermined number of code words after the occurrence of said first predetermined signal in said first time slot and means at a receiving terminal responsive to said signals transmitted in said second predetermined time slot to group received code signals into code words.

2. Apparatus for framing reflected binary code signals which comprises, in combination, means at a transmitting terminal for grouping the code signals into individual time slots to form code words, means at the transmitting terminal for monitoring the occurrence of "0's" in the second time slot of the code words, means at the transmitting terminal for transmitting a "1" in the least significant digit time slot of a code word having a "0" in its second time slot, means at the transmiting terminal for inhibiting said monitoring means for a predetermined number time slot upon the occurrence of the next monitored code word having a "0" in its second time slot so that alternating "1's" and "0's" are transmitted in the least significant digits of monitored code words, and means at a receiving terminal responsive to said alternating "1's" and "0's" transmitted in said least significant digit of said monitored code words to group received code signals into code words.

3. Apparatus for framing reflected binary code signals which comprises, in combination, means at a transmitting terminal for grouping the code signals into individual time slots to form code words, means at the transmitting terminal for monitoring the occurrences of first predetermined signals in a first predetermined time slot, means at the transmitting terminal for transmitting predetermined code signals in a second predetermined time slot upon the occurrence of said first predetermined signal in said first time slot, means at the transmitting terminal for inhibiting said monitoring means for a predetermined number of code words after the occurrence of a first predetermined signal, means at the transmitting terminal for transmitting said code words in serial form over a transmission medium, means at a receiving terminal to provisionally group received code signals into code words, means to monitor said provisionally chosen code words and determine when a first predetermined signal is present in a predetermined one of the time slots of a one of said code words, means at the receiving terminal for inhibiting said monitoring means at said receiving terminal for a predetermined number of code words after the occurrence of said first predetermined one of the time slots, means to record the signal transmitted in a second predetermined time slot of a first provisionally grouped word having a first predetermined signal in said first predetermined time slot, means to compare said recorded signal and the signal present in the second predetermined time slot of the next monitored code word, and means to generate a correction signal when said comparison means indicates that said signals are the same.

4. Apparatus for framing reflected binary code signals which comprises, in combination, means at a transmitting terminal for grouping the code signals into individual time slots to form code words, means at the transmitting terminal for monitoring the occurrence of "0's" in the second time slot of the code words, means at the transmitting terminal for transmitting a "1" in the least significant digit time slot of the code word having a "0" in its second time slot, means at the transmitting terminal for inhibiting said monitoring means for a predetermined number of code words after the occurrence of a "0" in the second time slot of a code word, means at the transmitting terminal for transmitting a "0" in the least significant digit time slot upon the occurrence of the next monitored code word having a "0" in its second time slot so that alternating "1's" and "0's" are transmitted in the least significant digits of such monitored code words, means at a receiving terminal to record signals transmitted in the least significant digit of monitored code words and compare said signals to group received code signals into code words.

References Cited

UNITED STATES PATENTS

| | | | |
|---|---|---|---|
| 3,175,157 | 3/1965 | Mayo et al. | 325—38 |
| 3,359,372 | 12/1967 | De Burro. | |
| 3,423,534 | 1/1969 | Pan. | |
| 3,426,153 | 2/1969 | Kitsopoulos. | |
| 3,436,480 | 4/1969 | Pan | 178—69.5 |
| 3,454,722 | 7/1969 | Jousset et al. | |

ROBERT L. GRIFFIN, Primary Examiner

A. J. MAYER, Assistant Examiner

U.S. Cl. X.R.

325—38, 42